UNITED STATES PATENT OFFICE.

EUGENIO DE ZUCCATO, OF LONDON, ENGLAND.

IMPROVEMENT IN PROCESSES FOR PRODUCING COPIES OF WRITINGS, &c.

Specification forming part of Letters Patent No. 171,780, dated January 4, 1876; Reissue No. 8,853, dated August 12, 1879: application filed May 29, 1879; patented in England, September 15, 1874.

*To all whom it may concern:*

Be it known that I, EUGENIO DE ZUCCATO, of London, England, have invented a new and useful Improvement in Producing Fac-Simile Copies of Writings or Drawings, of which the following is a specification.

My invention relates to improvements in producing fac-simile copies of writings or drawings; and consists of improvements made on an invention for which Letters Patent of the United States were granted to me on the 24th day of November, 1874, No. 157,161, and on the process therein described.

My invention is also described and claimed in my English Letters Patent No. 3,150 of the year 1874.

In the first place, it is requisite to obtain a thin sheet of paper close in texture, and which has been highly sized and well rolled, and is of the thickness generally known in commerce as "bank-post." Other kinds of paper may probably be used as substitutes; but I recommend, as being best adapted for the purpose of carrying out my invention, the use of such paper as I have described.

In the next place, the sheet of paper before described should upon one side be entirely covered or coated with an impermeable or water-proof substance, such as resin dissolved in spirits of wine or oil of turpentine, and I recommend, as being best adapted for the purposes of my invention, the composition known as "gilders' lacquer," to which I usually add to every three parts of the same one part of methylated spirit, for the purpose of causing the lacquer to flow more freely and evenly during the operation of coating; and in order to render the composition softer, I add Venice turpentine in the proportion of one-sixteenth part of the whole. These proportions, however, may vary, according to the substance or quality of the lacquer and the quality of the paper used. The ingredients, when mixed, must be thoroughly dissolved and united before being used. This varnish must be laid on the paper evenly, and can be most conveniently done by means of a broad and soft brush, and this operation should be repeated twice or three times, according to the consistency of the varnish and the quality of the paper. The paper, when so coated, must be thoroughly dried before being used, and the sheets thus prepared should be kept ready for immediate use.

In the next place, upon the uncoated side of a sheet of paper so prepared and perfectly dry, the writing or drawing of which fac-simile copies are intended to be produced should be executed with an ordinary steel pen, using for ink the liquid preparation hereinafter described, and which writing or drawing must be allowed to dry. The liquid preparation which I employ consists of a caustic preparation, such as water which has been saturated with hydrate of sodium or hydrate of potassium, which preparation may be colored with a suitable coloring-matter, such as Vandyke brown, or other coloring-matter capable of withstanding the action of the alkali, and which matter will not neutralize the caustic properties of the preparation.

In the next place, in order that the prepared paper which has been written or drawn upon with the described alkaline solution may be used for producing fac-simile copies, it is necessary to remove those parts of the varnish that have been acted upon or corroded by the action of the alkaline solution. This removal may be effected in several ways; but I prefer the following method, namely: Upon a piece of textile fabric, such as calico or linen that has been saturated with clean water, the coated side of the written prepared paper is to be placed, and firmly and evenly pressed down, first covering it with a sheet of blotting-paper. The water from the fabric will in a few minutes commence to ooze through the lines of the writing or drawing, and the moisture appearing on the uncoated surface should be immediately removed by means of the blotting-paper alluded to, in order to stay any lateral action of the alkaline solution. This process should be continued until all the lines of the writing or drawing are perfectly clear, which is a certain indication that the solution has operated sufficiently. The prepared paper may now be removed, and any portions of corroded varnish that still remain may be washed away with a soft brush. The effect produced by the operation before described is to remove such portions of the varnish as have been acted upon or corroded by the alkaline solution along the lines of writing or drawing, thus forming a porous-paper stencil. So far my process does not differ materially from that described in my above-mentioned patent of November 24, 1874, No. 157,161. It is next necessary to form a pad by saturating with coloring-matter held in solution a piece of cloth, velvet, or similar material, which must be cut slightly larger than the space occupied by the writing or drawing to be copied, while it must be smaller than the paper holding such writing or drawing, said paper extending beyond the edges of the pad.

I recommend the following printing solution as best adapted for the purposes of my invention, namely: A strong solution of an aniline color in glycerine, and I commonly use what is commercially known as the best aniline violet, and the proportions I employ are usually from two to three ounces of this color ground and well mixed with one pound of glycerine. The quality of the aniline violet is found to vary considerably, and the exact proportions must depend on this quality. In practice, however, the above will be found near enough.

The printing-pad and paper to be printed from having been prepared, fac-simile copies of the writing or drawing contained by said paper are produced as follows: The printing-pad, saturated with the printing-solution, is placed upon a perfectly flat surface, such as a piece of flat pasteboard rendered water-proof. The prepared paper containing the writing or drawing is placed upon the pad so that the uncoated side thereof, upon which the writing or drawing has been executed, and which must be evenly painted while the lines of such writing or drawing are still damp with the printing-solution, may be next to the pad, and the coated or varnished side uppermost. Flat upon the surface of the prepared paper put a piece of blotting-paper, and upon the top of the whole thus arranged place another piece of pasteboard, which might be bound with the first piece of pasteboard hereinbefore mentioned, and press the whole together in an ordinary letter-press or some modification thereof. After a few seconds the blotting-paper is removed and a sheet of the paper to be printed upon substituted, which is then pressed in the manner described against the prepared paper or porous stencil, and will be found to bear in the color of the printing-solution an exact fac-simile or copy of the writing or drawing contained upon the prepared paper. Care must be taken so that the pressure is evenly distributed. Without disturbing the arrangement of the pad and prepared paper, a fresh sheet of the paper to be printed upon is placed upon the prepared sheet in place of the sheet that has been printed, and, upon submitting it to pressure, it will be found that a second copy has been produced, and by continuing the process a great number of sheets or copies may be successively obtained. The action that ensues is as follows: The solution of coloring-matter with which the pad is saturated, being separated by the intervening prepared sheet, containing the writing or drawing, is forced through the lines of such writing or drawing which have been previously corroded by the action of the alkaline solution and deposited upon the sheet to be printed upon.

Instead of writing or drawing upon the prepared paper, the operator can write or draw upon a plain sheet of bank-post paper before it is coated, and when the alkaline solution is dry can apply the varnish to one or both sides, and proceed afterward, when the varnish is dry, to wash the paper so treated, and print the copies as before described—that is to say, upon ordinary paper.

The distinction between my present invention and that described in my American Letters Patent No. 157,161, dated November 24, 1874, and also in my English Patent No. 1,963 of the year 1872, is that in my former process I used chemically-prepared solution, which required for its action in copying a chemically-sensitized surface, while in the present case I use any marking-fluid, and produce the copies upon an unsensitized surface.

Having now described my invention, what I claim, and desire to secure by Letters Patent, is—

The herein-described process of producing fac-simile copies of writings, drawings, and delineations, which consists, first, in the formation of a stencil from paper rendered impermeable to moisture, excepting at the places where the writing, drawing, or delineation upon such paper has been made; and, secondly, in forcing an ordinary semi-liquid marking-liquid into and through the permeable parts of the paper stencil by means of pressure applied to a pad saturated with such marking-liquid, and held against one side of the stencil, the object upon which the copy is to be printed having an unsensitized surface and being held against the opposite side of the stencil.

EUG. DE ZUCCATO.

Witnesses:
M. L. ADAMS,
EDWD. PAYSON.